US011690075B2

(12) United States Patent
Taherzadeh Boroujeni et al.

(10) Patent No.: US 11,690,075 B2
(45) Date of Patent: Jun. 27, 2023

(54) MULTI-SLOT BLIND DETECTION LIMITS

(71) Applicant: QUALCOMM Incorporated, San Diego, CA (US)

(72) Inventors: Mahmoud Taherzadeh Boroujeni, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 83 days.

(21) Appl. No.: 17/356,975

(22) Filed: Jun. 24, 2021

(65) Prior Publication Data

US 2022/0015076 A1    Jan. 13, 2022

Related U.S. Application Data

(60) Provisional application No. 63/050,694, filed on Jul. 10, 2020.

(51) Int. Cl.
*H04W 72/10* (2009.01)
*H04L 1/00* (2006.01)
*H04W 72/23* (2023.01)

(52) U.S. Cl.
CPC ........... *H04W 72/23* (2023.01); *H04L 1/0038* (2013.01)

(58) Field of Classification Search
CPC ............................ H04W 72/042; H04L 1/0038
See application file for complete search history.

(56) References Cited

U.S. PATENT DOCUMENTS

| 2019/0223164 | A1 | 7/2019 | He et al. | |
| 2020/0229093 | A1* | 7/2020 | Ahmad | H04W 72/042 |
| 2021/0352501 | A1* | 11/2021 | Boroujeni | H04W 72/0446 |
| 2022/0014307 | A1* | 1/2022 | Boroujeni | H04L 1/0046 |

OTHER PUBLICATIONS

Huawei, Summary of remaining issues on PDCCH monitoring with TP, Mar. 2018 (Year: 2018).*
International Search Report and Written Opinion—PCT/US2021/039223—ISA/EPO—dated Oct. 14, 2021.

* cited by examiner

*Primary Examiner* — Ronald B Abelson
(74) *Attorney, Agent, or Firm* — Procopio, Cory, Hargreaves & Savitch LLP

(57) ABSTRACT

To facilitate more flexible blind detection, a UE may be configured receive PDCCH in a set of consecutive slots, the set of consecutive slots comprising at least two slots. The UE may be further configured to perform blind detection on each PDCCH received in the set of consecutive slots based on a first PDCCH blind detection limit and a second PDCCH blind detection limit, the first PDCCH blind detection limit being a single-slot limit, the second PDCCH blind detection limit being a multi-slot limit.

20 Claims, 10 Drawing Sheets

MULTI-SLOT BLIND DETECTION LIMITS

CROSS REFERENCE TO RELATED APPLICATION(S)

This application claims the benefit of and priority to U.S. Provisional Application Ser. No. 63/050,694, entitled "MULTI-SLOT BLIND DETECTION LIMITS" and filed on Jul. 10, 2020, which is expressly incorporated by reference herein in its entirety.

BACKGROUND

Technical Field

The present disclosure relates generally to communication systems, and more particularly, to a wireless communication network with physical downlink control channel (PDCCH) blind detection.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

To facilitate more flexible blind detection, a user equipment (UE) may be configured to receive PDCCH in a set of consecutive slots. The set of consecutive slots may include at least two slots. The UE may be further configured to perform blind detection on each PDCCH received in the set of consecutive slots based on a first PDCCH blind detection limit and a second PDCCH blind detection limit. The first PDCCH blind detection limit may be a single-slot limit. The second PDCCH blind detection limit may be a multi-slot limit.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
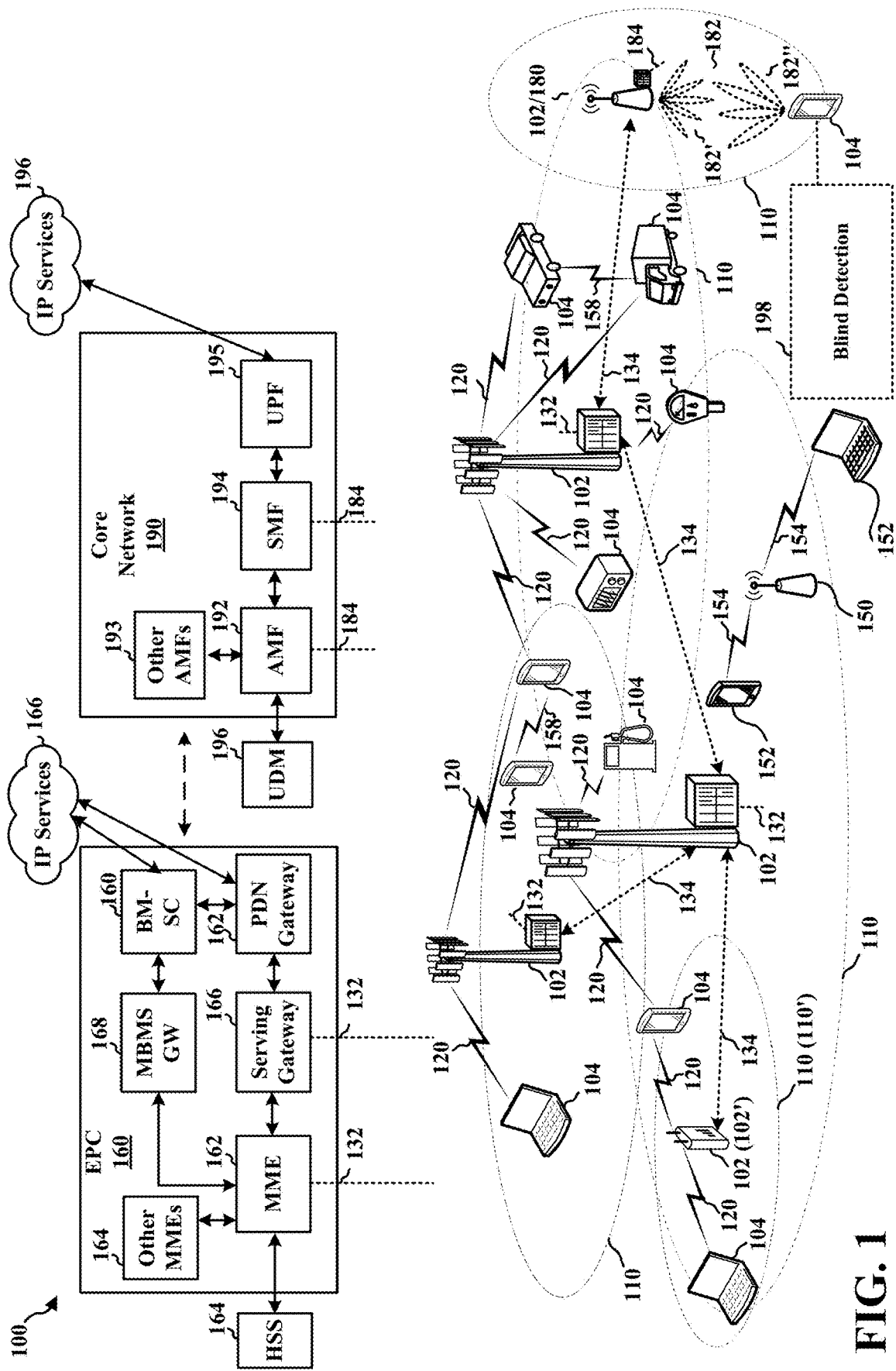
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may be configured to receive PDCCH in a set of consecutive slots and perform blind detection 198 on multiple PDCCH received in a set of consecutive slots based a set of blind detection limit. The set of blind detection limit includes at least a first PDCCH blind detection limit that is a single-slot limit and a second PDCCH blind detection limit that is a multi-slot limit.

Although the following description may be focused on 5G NR, the concepts described herein may be applicable to other similar areas, such as LTE, LTE-A, CDMA, GSM, and other wireless technologies.

Figure 2:
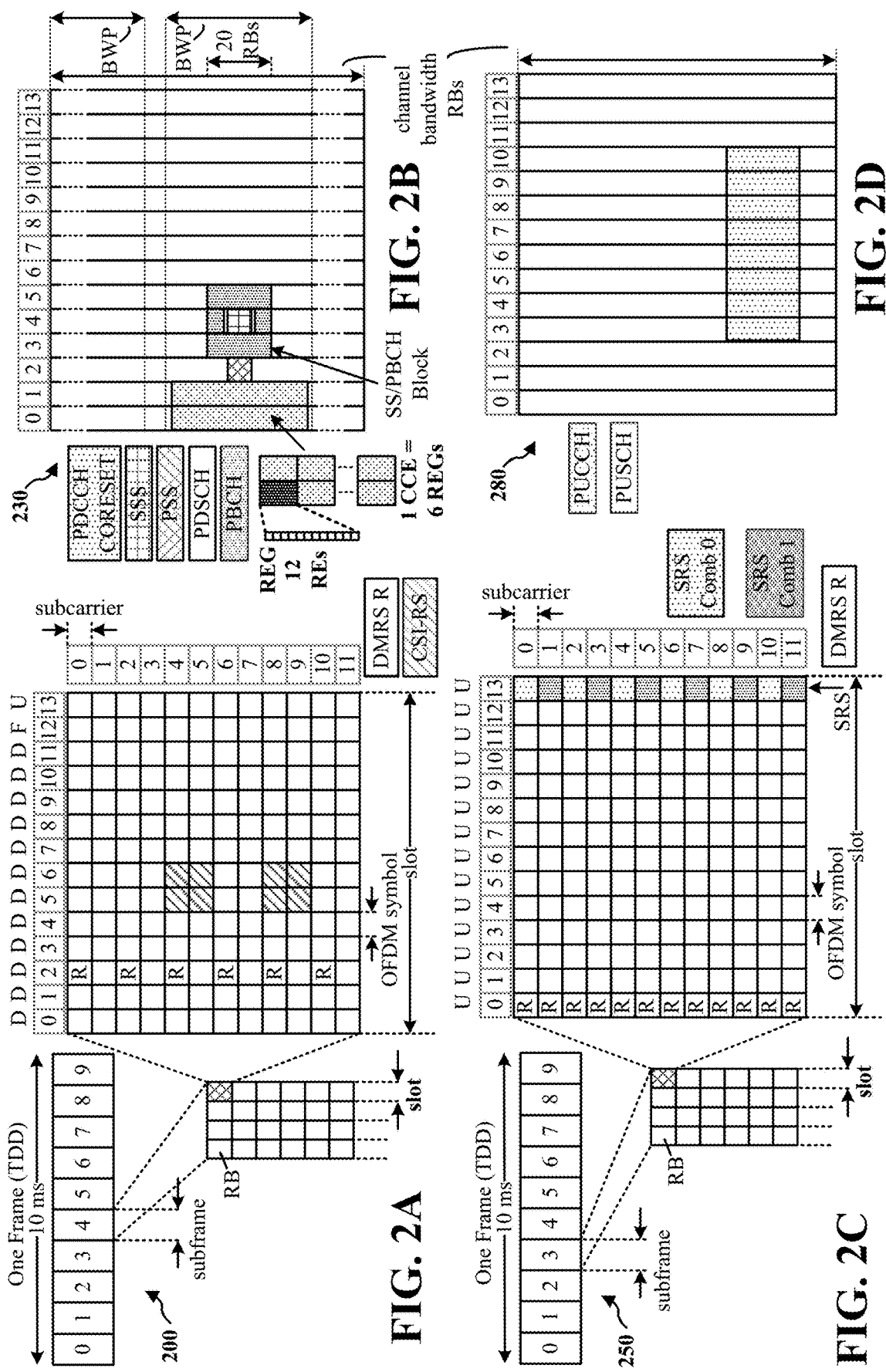
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
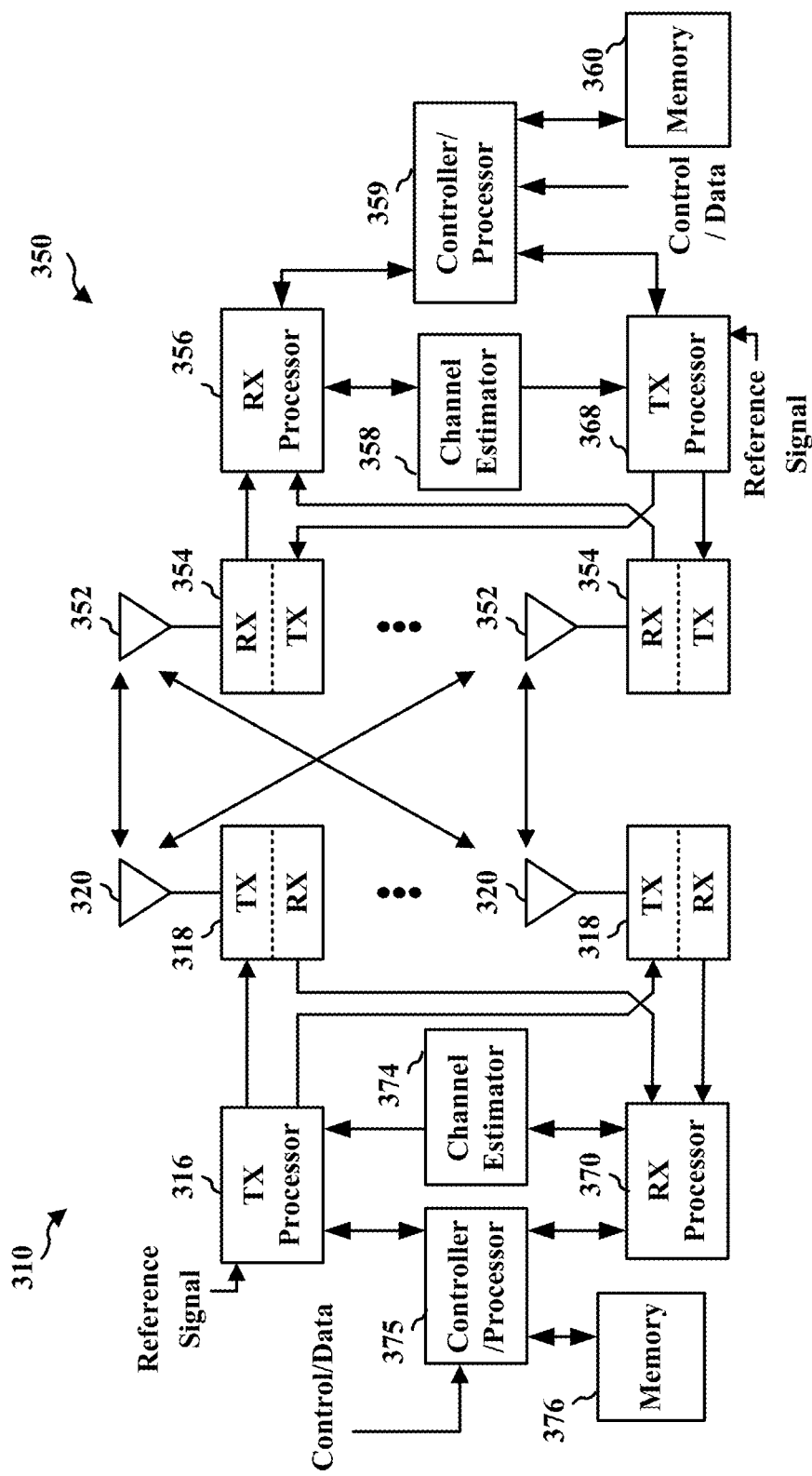
FIG. 3 is a diagram illustrating an example of a base station and UE in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with blind detection 198 of FIG. 1.

In wireless communication systems, a PDCCH that carries DCI within one or more CCEs may be transmitted from a base station to a UE. The base station may transmit multiple PDCCH candidates (which may also be referred as "PDCCHs") to the UE. The transmitted PDCCHs may or may not be intended for, or relevant to, the UE. Because the UE is not provided with the locations of the PDCCHs that are relevant to the UE, the UE may perform blind decoding of the PDCCHs to find a subset of PDCCHs that are relevant to the UE among the transmitted PDCCHs.

Figure 4:
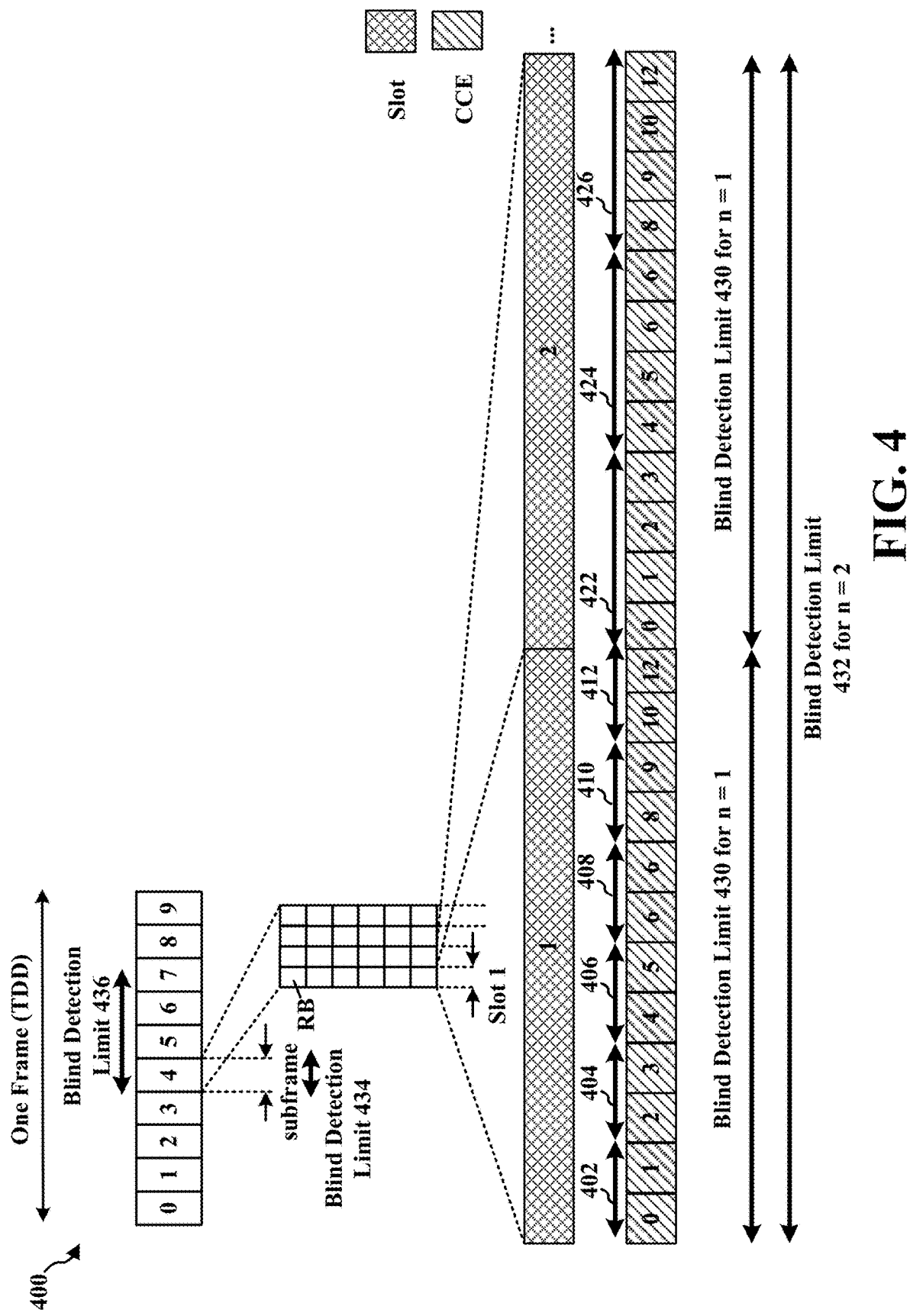
FIG. 4 illustrates example PDCCHs of different aggregation levels and example blind detection limits.

The PDCCHs to be blind decoded (and monitored) by the UE are carried by search spaces. Each of the search spaces may be a common search space, which is commonly monitored by a group of UEs in the cell, or a UE-specific search space, which is monitored by an individual UE. Each search space may be associated with a search space index number and later search spaces within a single slot or a number of slots may be assigned with larger index numbers. The PDCCHs may be associated with (i.e., include, or otherwise referred as mapped to or carried by) CCEs of an associated CORESET. One PDCCH may be mapped to one or more CCEs and the number of CCEs associated with the PDCCH may be referred as an aggregation level associated with the PDCCH. As illustrated in FIG. 4, PDCCHs 402, 404, 406, 408, 410, and 412 within slot #1 are each associated with two CCEs. As a result, PDCCHs 402, 404, 406, 408, 410, and 412 have an aggregation level of 2. PDCCHs 422, 424, and 426 within slot #2 are each associated with four CCEs. As a result, PDCCHs 422, 424, and 426 have an aggregation level of 4.

In some wireless communication systems, the limit on the total number of PDCCH blind decodes and the limit on the total number of CCEs that are covered by the monitored PDCCHs are defined per slot. For example, it may be defined that for 15/30/60/120 kHz subcarrier spacing, the total number of blind decodes in a slot are limited to 44/36/22/20 and the total number of CCEs in the slot are limited to 56/56/48/32. If the UE would surpass the blind detection limit, the UE may drop blind detection, or may skip monitoring for, the PDCCHs and associated search spaces having the last/largest index.

For a higher frequency and a larger subcarrier spacing (corresponding to shorter symbols), the available time for processing of PDCCH becomes much shorter which puts pressure on blind detection limits. As explained earlier, for 15/30/60/120 kHz subcarrier spacing the blind detection limit may be 44/36/22/20 decodes. Such limitation of a single-slot limit on blind detection may reduce the flexibility of base station for PDCCH scheduling and may increase blockage probability.

Depending on the configuration of search spaces and their periodicities (and time offsets), the number of PDCCHs that may be monitored (and the number of CCEs covered by them) may change from one slot to another one. Therefore, the UE may be able to distribute the complexity of PDCCH monitoring across multiple slots by utilizing the more flexible PDCCH blind detection limits provided herein (e.g., if the minimum scheduling offset restriction K0 min and K2 min that may be configured for BWP allows delay in PDCCH processing).

In some aspects, a set of blind detection limits on the number of PDCCH blind decodes and the number of CCEs covered by the PDCCHs may be defined for a set of n consecutive slots. As illustrated in FIG. 4, the set of blind detection limits may include at least a single-slot blind detection limit 430 for n=1 and a multi-slot blind detection limit for n>1 (such as blind detection limit 432 for two consecutive slots n=2). In some aspects, additional blind detection limits, such as a blind detection limit 434 for four consecutive slots (n=4), may be present. In some aspects, the multi-slot blind detection limit(s) may be dependent on a subcarrier spacing even though the multi-slot blind detection limit(s) might not be proportional to the subcarrier spacing. Limits on blind decodes (or CCEs covered by them) for n consecutive slots may be smaller than n time the corresponding limits for a single-slot. For example, the multi-slot blind detection limit for 4 consecutive slots may be 88 while the single-slot blind detection limit 430 for each slot in the 4 consecutive slots may be 30 for 60 kHz subcarrier spacing. In some aspects, a multi-slot blind detection limit may be for consecutive slots that are within a same subframe or across different subframes. For example, an example multi-slot blind detection limit 436 may be present for consecutive slots that are across different subframes.

If a UE would surpass a multi-slot blind detection limit, the last search space (i.e. the search space with largest index) may be dropped, e.g., by the UE skipping monitoring for or blind decoding of the search space. For example, as illustrated in example 500 of FIG. 5A, if the multi-slot blind detection limit for 4 consecutive slots is 88 and the number of PDCCHs per slot in slots 1, 2, 3, and 4 are 20, 20, 30, and 20, the UE may drop, e.g., skip blind decoding of, the last two search spaces associated with the PDCCHs.

If a UE would surpass a blind detection limit related to the number of CCEs, a subset of PDCCH candidates with aggregation level (AL) greater than a certain threshold may be dropped. Referring to example 550 of FIG. 5B, the number of CCEs carrying PDCCHs in slots 1, 2, 3, and 4 are 40, 80, 60, 40. The aggregation level for slots 1, 3, and 4 is 2 and the aggregation level for slot 2 is 4. A multi-slot blind detection limit for 4 consecutive slots may define that the number of CCEs within 4 slots cannot surpass 192. A UE may prioritize PDCCH candidates with lower AL. After considering slot 1 with 40 CCEs, slot 3 with 60 CCEs, and slot 4 with 40 CCEs, 140 of the 192 limit is used and the UE may be left with 52 remaining blind detections for slot 2. Therefore, 28 CCEs associated with slot 2 may be dropped. As a result, if the AL threshold is 2, a subset of PDCCHs (such as the last 7 PDCCHs) associated with slot 2 will be dropped. In some aspects, the dropping of PDCCH candidates with high AL may start with the search space with the lowest priority or with the largest index.

In some aspects, if the UE would pass the limits for multiple values of n (e.g. n=1 and n=4), of the UE may drop, or skip, the search space for smaller values of n and may check again and accordingly perform blind detection for larger values of n after dropping search space according to the limits of smaller values of n. For example, as illustrated in example 580 of FIG. 5C, the multi-slot blind detection limit for 4 consecutive slots may be 88 and the single-slot blind detection limit may be 30 while the number of PDCCHs per slot in slots 1, 2, 3, and 4 are 19, 32, 19, and 19. The UE may first perform dropping based on n=1 by checking the single-slot limit of 30. Based on the single-slot limit of 30, the UE may drop search spaces associated with 2 PDCCHs (such as the last 2 PDCCHs) on slot 2 so that there is a total of 30 PDCCH blind detections associated with slot 2, meeting the single-slot blind detection limit. After dropping for the smaller value(s) of n (n=1 in the illustrated example), the UE may re-determine whether the blind detection limit for larger value(s) of n are surpassed. In the example illustrated in FIG. 5C, after the UE drops search spaces associated with 2 PDCCHs on slot 2 based on the single-slot limit, the UE may blind decode a total of 19+30+19+19=87 PDCCHs within the 4 consecutive slots, which meets the defined multi-slot blind detection limit for 4 consecutive slots of 88. Therefore, no further dropping would be performed by the UE.

Figure 6:
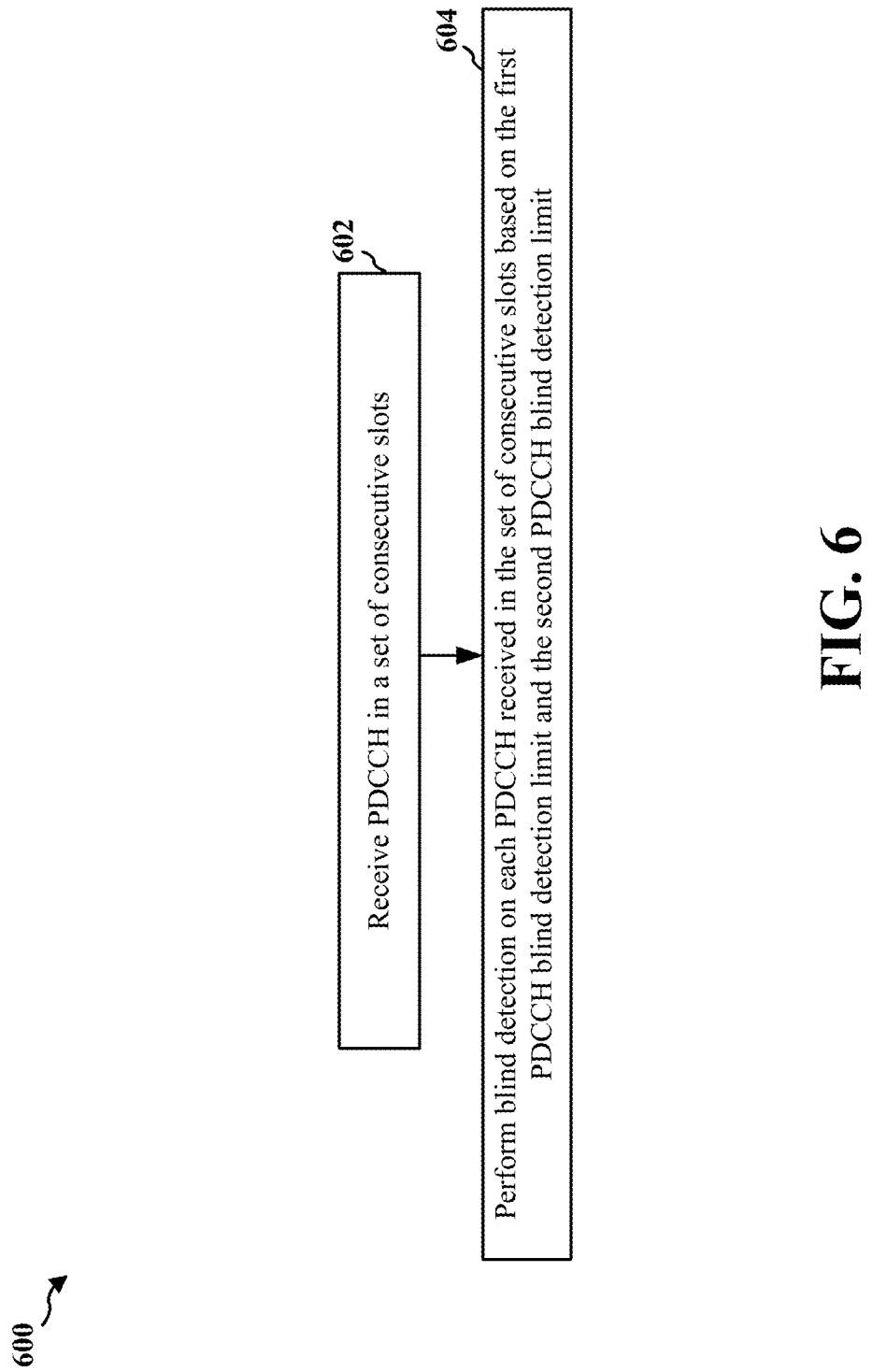
FIG. 6 is a flowchart of a method of wireless communication at a UE.

FIG. 6 is a flowchart 600 of a method of wireless communication. The method may be performed by a UE (e.g., the UE 104; the apparatus 802). The method may provide more flexible blind detection which may in turn improve communication efficiency, such as by decreasing probability of blockage.

Figure 5A:
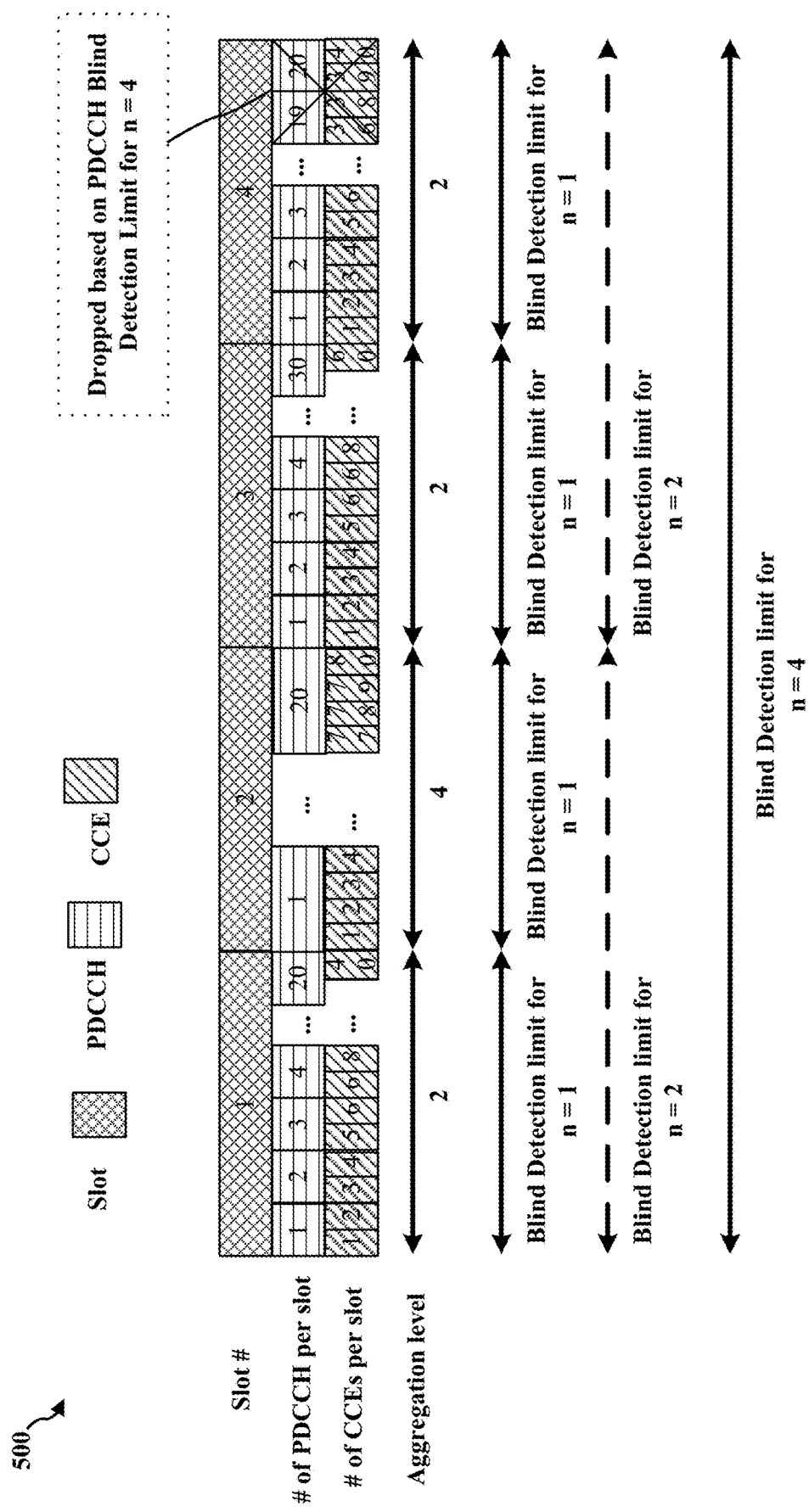
FIGS. 5A, 5B, and 5C illustrate example dropping of PDCCHs.
Figure 5B:
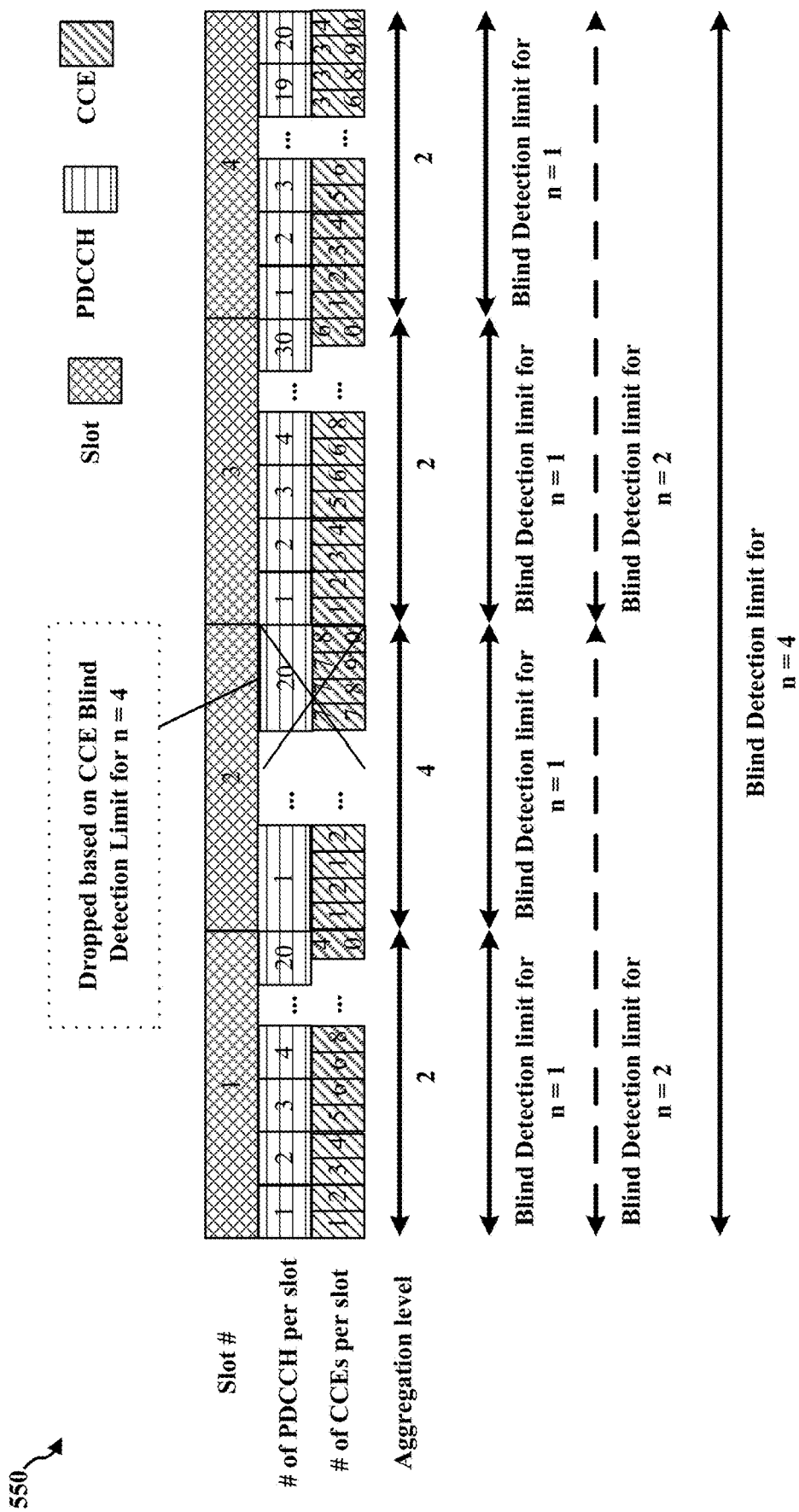
Figure 5C:
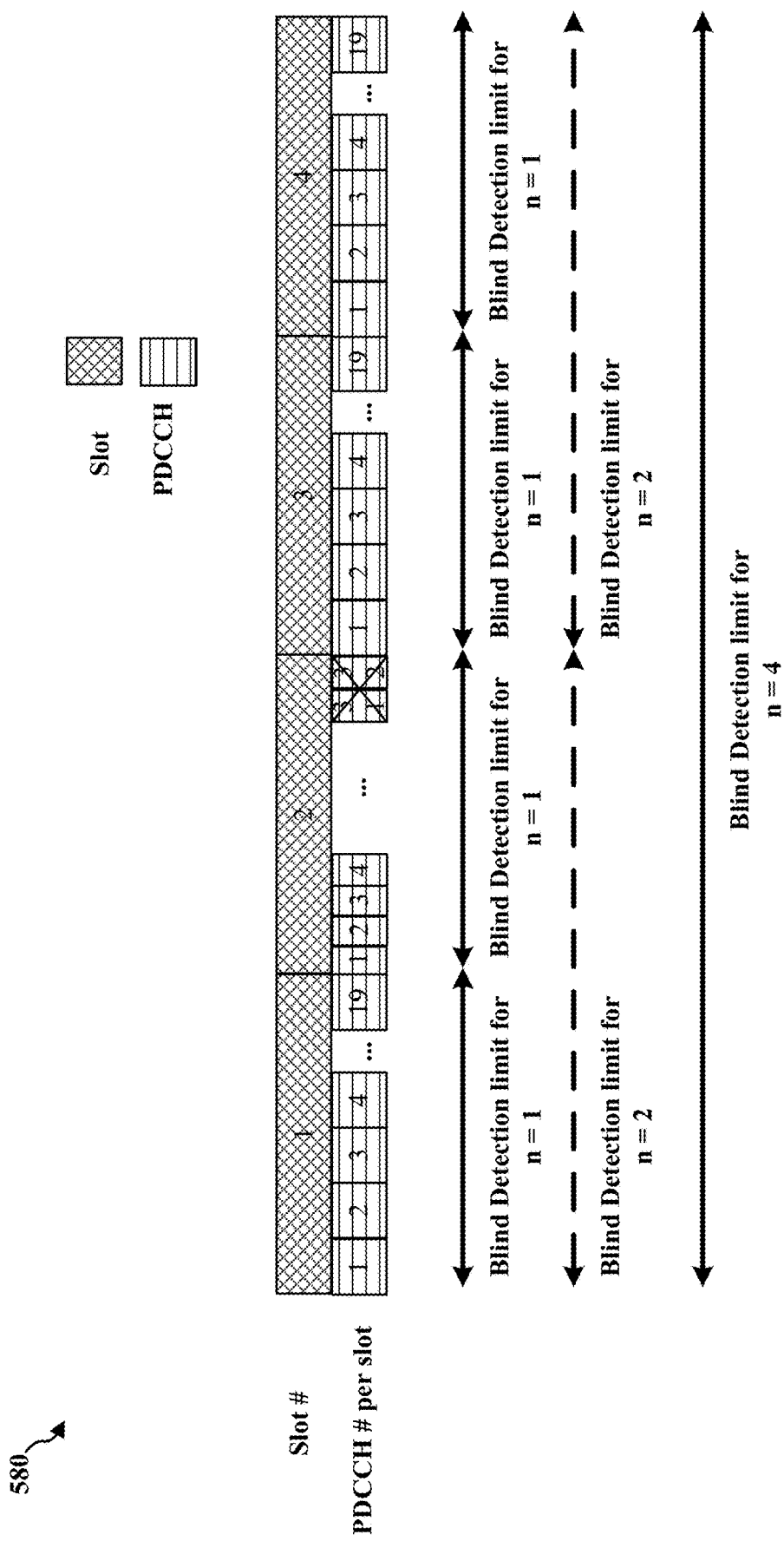

At 602, the UE may receive PDCCH in a set of consecutive slots. The set of consecutive slots may include at least two slots. For example, a UE may receive PDCCH in a set of consecutive slots 1, 2, 3, and 4 as illustrated in FIGS. 5A to 5C. In some aspects, the reception at 602 may be performed by the reception component 830 of FIG. 8.

At 604, the UE may perform blind detection on each PDCCH (i.e., each PDCCH candidate) received in the set of consecutive slots based on a first PDCCH blind detection limit and a second PDCCH blind detection limit. For example, the UE may perform blind detection on each PDCCH received in the set of consecutive slots 1, 2, 3, and 4 as illustrated in FIGS. 5A to 5C. In some aspects, 604 may be performed by PDCCH decoding component 840. The first PDCCH blind detection limit may be a single-slot limit. The second PDCCH blind detection limit may be a multi-slot limit.

Figure 7:
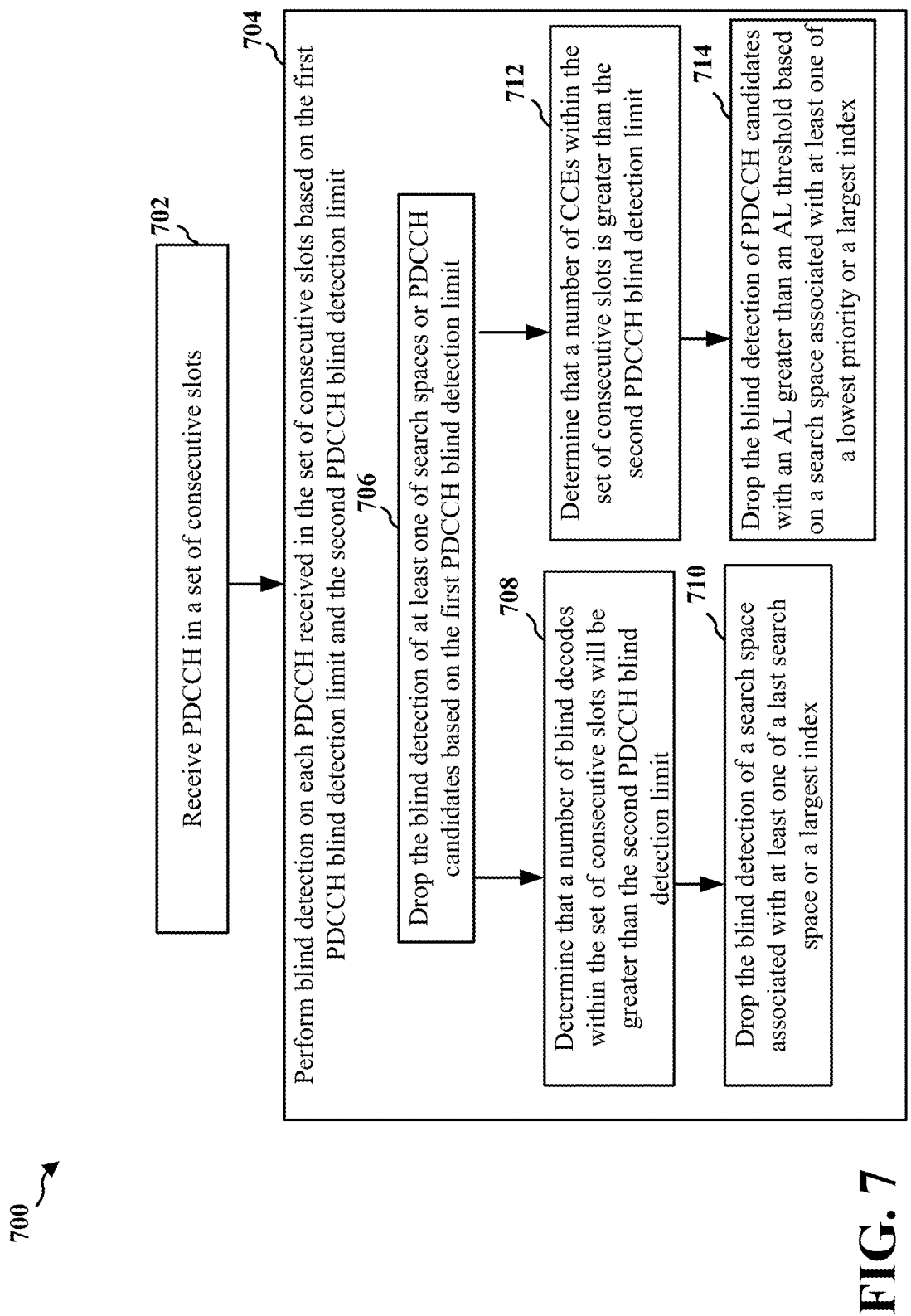
FIG. 7 is a flowchart of a method of wireless communication at a UE.

FIG. 7 is a flowchart 700 of a method of wireless communication. The method may be performed by a UE (e.g., the UE 104; the apparatus 802). The method may provide more flexible blind detection which may in turn improve communication efficiency, such as by decreasing probability of blockage.

At 702, the UE may receive PDCCH in a set of consecutive slots. The set of consecutive slots may include at least two slots. For example, a UE may receive PDCCH in a set of consecutive slots 1, 2, 3, and 4 as illustrated in FIGS. 5A to 5C. In some aspects, the reception at 604 may be performed by the reception component 830 of FIG. 8.

At 704, the UE may perform blind detection on each PDCCH (i.e., each PDCCH candidate) received in the set of consecutive slots based on a first PDCCH blind detection limit and a second PDCCH blind detection limit. For example, the UE may perform blind detection on each PDCCH received in the set of consecutive slots 1, 2, 3, and 4 as illustrated in FIGS. 5A to 5C. In some aspects, 704 may be performed by PDCCH decoding component 840. The first PDCCH blind detection limit may be a single-slot limit. The second PDCCH blind detection limit may be a multi-slot limit.

In some aspects, the UE may determine the first PDCCH blind detection limit for each slot of a set of consecutive slots. In some aspects, the first PDCCH blind detection limit may define at least one of a limit on a number of blind decodes or a limit on a number of CCEs subject to blind detection within one slot. In some aspects, the first PDCCH blind detection limit determined by the UE may be a pre-defined PDCCH blind detection limit. For example, the UE may determine the first PDCCH blind detection limit for each slot of a set of consecutive slots by accessing the pre-defined first PDCCH blind detection limit in a configuration.

In some aspects, the UE may determine the second PDCCH blind detection limit for the set of consecutive slots. In some aspects, the second PDCCH blind detection limit may define at least one of a limit on a number of blind decodes or a limit on a number of CCEs subject to blind detection within a defined number of slots. In some aspects, the second PDCCH blind detection limit determined by the UE may be a pre-defined PDCCH blind detection limit. For example, the UE may determine the second PDCCH blind detection limit for each slot of a set of consecutive slots by accessing the pre-defined second PDCCH blind detection limit in the configuration.

In some aspects, the second PDCCH blind detection limit may be based on a subcarrier spacing of the received PDCCH. In some aspects, the set of consecutive slots includes n slots, where n≥2, and $D_2<D_1*n$, where $D_1$ is the first PDCCH blind detection limit and $D_2$ is the second PDCCH blind detection limit (and where * refers to a multiplication symbol). For example, if the subcarrier spacing is 60 kHz, the second PDCCH blind detection limit may define that the number of blind decoding attempts of the UE within 4 consecutive slots is limited to below 88 attempts. The first PDCCH blind detection limit may define the blind decoding attempt within each slot of the 4 consecutive slots to below 30 attempts (i.e., 88<30*4) or any number greater than 22.

In some aspects, the UE may determine a third or more additional pre-defined PDCCH blind detection limits for a number of consecutive slots between 1 and n. For example, the UE may determine a third PDCCH blind detection limit for every 2 consecutive slots in addition to the first PDCCH blind detection limit for each slot and the second PDCCH blind detection limit for 4 consecutive slots.

The PDCCH received may be associated with one or more of Type0-PDCCH common search space set, Type1-PDCCH common search space set, Type2-PDCCH common search space set, Type3-PDCCH common search space set, or UE-specific search space set.

As part of 704, in some aspects, at 706, the UE drops at least one of search spaces or PDCCH candidates based on the first PDCCH blind detection limit before dropping at least one of search spaces or the PDCCH candidates based on the second PDCCH blind detection limit. For example, referring back to FIG. 5C, if the first PDCCH blind detection limit defines that the UE is limited to 30 blind decodes within a single-slot and the second PDCCH blind detection limit defines that the UE is limited to 88 blind decodes within 4 consecutive slots, if the UE determines that the UE will blind decode 19 PDCCHs in slots 1, 3, and 4 and blind decode 32 PDCCHs in slot 2 of four consecutive slots, the UE may determine that the 32 PDCCHs in slot 2 exceeds the first PDCCH blind detection limit and may drop search spaces associated with 2 PDCCHs (such as the last 2 PDCCHs) of the 32 PDCCHs in slot 2. Then the UE may determine that after dropping the search spaces associated with the 2 PDCCHs in slot 2, the UE will blind decode 19+19+30+19=87 PDCCHs within the four consecutive slots 1, 2, 3, and 4 and the number of PDCCH blind decodes is within the second PDCCH blind detection limit of 88 blind decodes.

Similarly, if a third or more blind detection limit is present, the UE may drop at least one of search spaces or PDCCH candidates based on the PDCCH blind detection limit for a smaller number of slots first then drop based on the PDCCH blind detection limit for a larger number of slots. For example, the UE may drop at least one of search spaces based on the first PDCCH blind detection limit defining a limit for each slot first, then drop based on the third PDCCH blind detection limit defining a limit for every two consecutive slots, then drop based on the second PDCCH blind detection limit defining a limit for every four consecutive slots.

As part of 704, in some aspects, at 708, the UE determines that a number of blind decodes within the set of consecutive slots will be greater than the second PDCCH blind detection limit. For example, referring back to FIG. 5A, the UE may determine that the UE will blind decode 20 PDCCHs in slots 1, 2, and 4 and blind decode 30 PDCCHs in slot 3 of four consecutive slots. Therefore, the UE may determine that the number of blind decodes within the four consecutive slots 1-4 will be 20+20+30+20=90 which is greater than the second PDCCH blind detection limit of 88 slots.

As part of 704, in some aspects, at 710, the UE drops a search space associated with at least one of a last search space or a largest index when the determined number of the blind decodes is greater than the second PDCCH blind detection limit. For example, referring back to FIG. 5A, the UE may drop search spaces associated with the last two PDCCHs of slot 4 because these two search spaces are the last search spaces (i.e., search spaces with the largest index) among the search spaces associated with the 90 PDCCHs.

As part of 704, in some aspects, at 712, the UE determines that a number of CCEs within the set of consecutive slots is greater than the second PDCCH blind detection limit. For example, referring back to FIG. 5B, the UE may determine that the number of CCEs within the 4 consecutive slots is 220 which exceeds a limit of 192 CCEs defined by the second PDCCH blind detection limit.

As part of 704, in some aspects, at 714, the UE drops a subset of PDCCH candidates with an AL greater than an AL threshold based on a search space associated with at least one of a lowest priority or a largest index. For example, referring back to FIG. 5B, the AL threshold may be 2 and PDCCHs within slot 2 are greater than an AL threshold of 2. As a result, the UE may drop 7 PDCCHs of the 20 PDCCHs within slot 2 to meet the limit of 192 CCEs defined by the second PDCCH blind detection limit.

Figure 8:
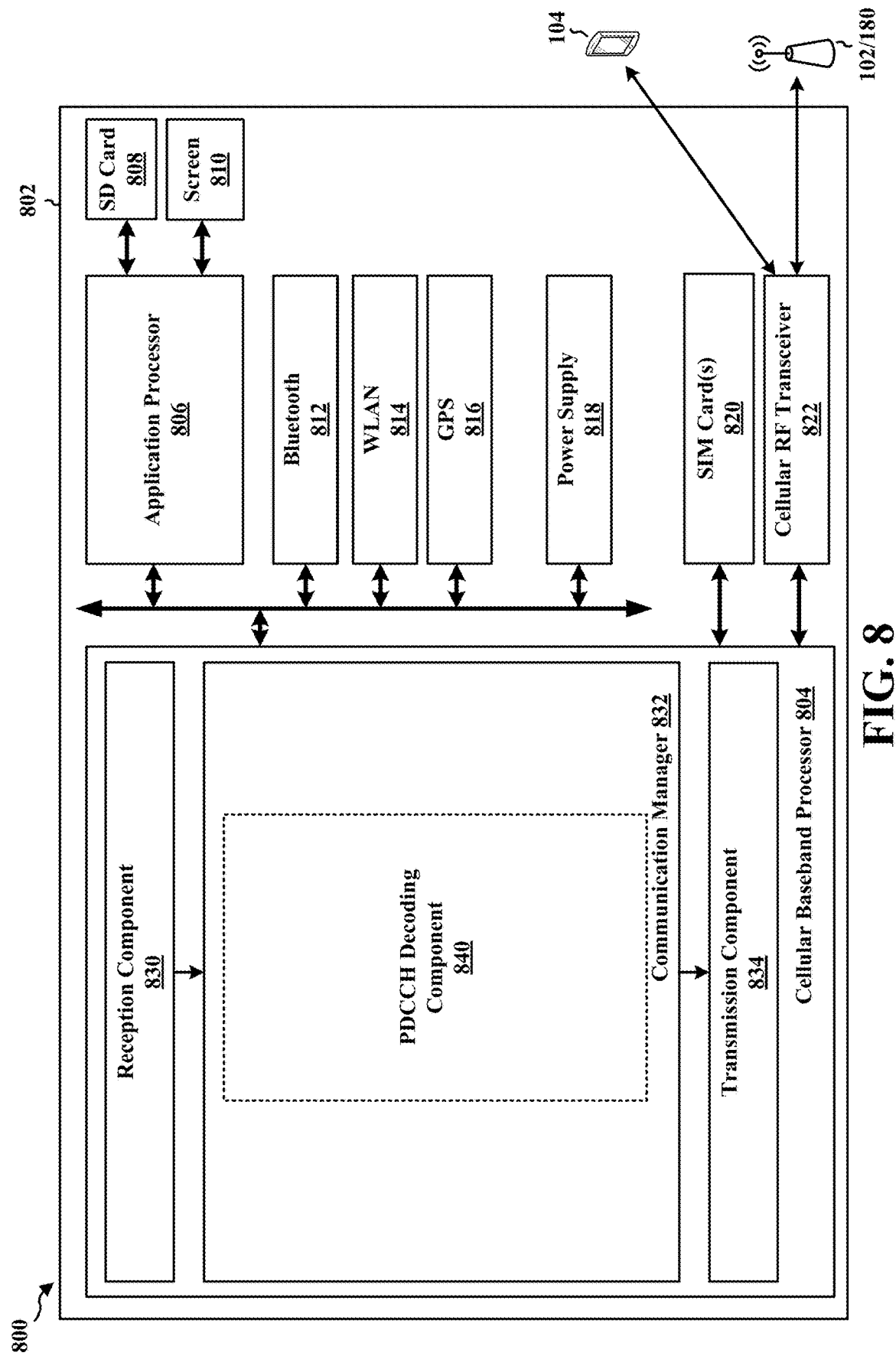
FIG. 8 is a diagram illustrating an example of a hardware implementation for an example apparatus.

FIG. 8 is a diagram 800 illustrating an example of a hardware implementation for an apparatus 802. The apparatus 802 is a UE and includes a cellular baseband processor 804 (also referred to as a modem) coupled to a cellular RF transceiver 822 and one or more subscriber identity modules (SIM) cards 820, an application processor 806 coupled to a secure digital (SD) card 808 and a screen 810, a Bluetooth module 812, a wireless local area network (WLAN) module 814, a Global Positioning System (GPS) module 816, and a power supply 818. The cellular baseband processor 804 communicates through the cellular RF transceiver 822 with the UE 104 and/or BS 102/180. The cellular baseband processor 804 may include a computer-readable medium/memory. The computer-readable medium/memory may be non-transitory. The cellular baseband processor 804 is responsible for general processing, including the execution of software stored on the computer-readable medium/memory. The software, when executed by the cellular baseband processor 804, causes the cellular baseband processor 804 to perform the various functions described supra. The computer-readable medium/memory may also be used for storing data that is manipulated by the cellular baseband processor 804 when executing software. The cellular baseband processor 804 further includes a reception component 830, a communication manager 832, and a transmission component 834. The communication manager 832 includes the one or more illustrated components. In some aspects, the reception component 830 may be configured to receive PDCCHs in a set of consecutive slots transmitted by a base station, e.g., as described in connection with 602 of FIG. 6 and 702 of FIG. 7. The components within the communication manager 832 may be stored in the computer-readable medium/memory and/or configured as hardware within the cellular baseband processor 804. The cellular baseband processor 804 may be a component of the UE 350 and may include the memory 360 and/or at least one of the TX processor 368, the RX processor 356, and the controller/processor 359. In one configuration, the apparatus 802 may be a modem chip and include just the cellular baseband processor 804, and in another configuration, the apparatus 802 may be the entire UE (e.g., see 350 of FIG. 3) and include the aforediscussed additional modules of the apparatus 802.

The communication manager 832 includes a PDCCH decoding component 840 that is configured to perform blind detection on each PDCCH received in the set of consecutive slots based on a first PDCCH blind detection limit and a second PDCCH blind detection limit, e.g., as described in connection with 604 of FIG. 6 and 704 of FIG. 7.

The apparatus may include additional components that perform each of the blocks of the algorithm in the aforementioned flowcharts of FIGS. 6-7. As such, each block in the aforementioned flowcharts of FIGS. 6-7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 802, and in particular the cellular baseband processor 804, includes means for receiving PDCCH in a set of consecutive slots, the set of consecutive slots comprising at least two slots. The cellular baseband processor 804 further includes means for determining a second PDCCH blind detection limit for the set of consecutive slots. The second PDCCH blind detection limit is a multi-slot limit. The cellular baseband processor 804 further includes means for performing blind detection on each PDCCH received in the set of consecutive slots based on a first PDCCH blind detection limit and a second PDCCH blind detection limit.

In some aspects, the second PDCCH blind detection limit is based on a subcarrier spacing of the received PDCCH.

In some aspects, the set of consecutive slots includes n slots, where $n \geq 2$, and $D_2 < D_1 * n$, where $D_1$ is the first PDCCH blind detection limit and $D_2$ is the second PDCCH blind detection limit.

In some aspects, the first PDCCH blind detection limit and the second PDCCH blind detection limit is each associated with at least one of a limit on a number of blind decodes, or a limit on a number of CCEs subject to the blind detection.

In some aspects, the means for performing the blind detection on each PDCCH received in the set of consecutive slots is configured to determine that a number of blind decodes within the set of consecutive slots will be greater than the second PDCCH blind detection limit. The means for performing the blind detection on each PDCCH received in the set of consecutive slots may be further configured to drop a search space associated with at least one of a last search space or a largest index when the determined number of the blind decodes is greater than the second PDCCH blind detection limit.

In some aspects, the means for performing the blind detection on each PDCCH received in the set of consecutive slots is configured to determine that a number of CCEs within the set of consecutive slots is greater than the second PDCCH blind detection limit. The means for performing the blind detection on each PDCCH received in the set of consecutive slots may be further configured to drop PDCCH candidates with an AL greater than an AL threshold based on a search space associated with at least one of a lowest priority or a largest index.

In some aspects, the means for performing the blind detection on each PDCCH received in the set of consecutive slots is configured to drop at least one of search spaces or PDCCH candidates based on the first PDCCH blind detection limit before dropping the at least one of search spaces or the PDCCH candidates based on the second PDCCH blind detection limit.

The aforementioned means may be one or more of the aforementioned components of the apparatus 802 configured to perform the functions recited by the aforementioned means. As described supra, the apparatus 802 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication of a UE, comprising: receiving PDCCH in a set of consecutive slots, the set of consecutive slots comprising at least two slots; and performing blind detection on each PDCCH received in the set of consecutive slots based on a first PDCCH blind detection limit and a second PDCCH blind detection limit, the first PDCCH blind detection limit being a single-slot limit, the second PDCCH blind detection limit being a multi-slot limit.

Aspect 2 is the method of aspect 1, wherein the second PDCCH blind detection limit is based on a subcarrier spacing of the received PDCCH.

Aspect 3 is the method of any of aspects 1-2, wherein the set of consecutive slots comprises n slots, where n≥2, and $D_2<D_1*n$, where $D_1$ is the first PDCCH blind detection limit and $D_2$ is the second PDCCH blind detection limit.

Aspect 4 is the method of any of aspects 1-3, wherein the first PDCCH blind detection limit and the second PDCCH blind detection limit is each associated with at least one of a limit on a number of blind decodes, or a limit on a number of CCE subject to the blind detection.

Aspect 5 is the method of any of aspects 1-4, wherein the performing the blind detection on each PDCCH received in the set of consecutive slots comprises: determining that a number of blind decodes within the set of consecutive slots will be greater than the second PDCCH blind detection limit; and dropping the blind detection of a search space associated with at least one of a last search space or a largest index if the determined number of the blind decodes is greater than the second PDCCH blind detection limit.

Aspect 6 is the method of any of aspects 1-5, wherein the performing the blind detection on each PDCCH received in the set of consecutive slots comprises: determining that a number of CCEs within the set of consecutive slots is greater than the second PDCCH blind detection limit; and dropping the blind detection of PDCCH candidates with an AL greater than an AL threshold based on a search space associated with at least one of a lowest priority or a largest index.

Aspect 7 is the method of any of aspects 1-6, wherein the performing the blind detection on each PDCCH received in the set of consecutive slots comprises: dropping the blind detection of at least one of search spaces or PDCCH candidates based on the first PDCCH blind detection limit before dropping the at least one of the search spaces or the PDCCH candidates based on the second PDCCH blind detection limit.

Aspect 8 is an apparatus for wireless communication, the apparatus being a UE, comprising: a memory; and at least one processor coupled to the memory and configured to: receive PDCCH in a set of consecutive slots, the set of consecutive slots comprising at least two slots; and perform blind detection on each PDCCH received in the set of consecutive slots based on a first PDCCH blind detection limit and a second PDCCH blind detection limit, the first PDCCH blind detection limit being a single-slot limit, the second PDCCH blind detection limit being a multi-slot limit.

Aspect 9 is the apparatus of aspect 8, wherein the second PDCCH blind detection limit is based on a subcarrier spacing of the received PDCCH.

Aspect 10 is the apparatus of any of aspects 8-9, wherein the set of consecutive slots comprises n slots, where n≥2, and $D_2<D_1*n$, where $D_1$ is the first PDCCH blind detection limit and $D_2$ is the second PDCCH blind detection limit.

Aspect 11 is the apparatus of any of aspects 8-10, wherein the first PDCCH blind detection limit and the second PDCCH blind detection limit is each associated with at least one of a limit on a number of blind decodes, or a limit on a number of CCE subject to the blind detection.

Aspect 12 is the apparatus of any of aspects 8-11, wherein to perform the blind detection on each PDCCH received in the set of consecutive slots, the at least one processor is further configured to: determine that a number of blind decodes within the set of consecutive slots will be greater than the second PDCCH blind detection limit; and drop the blind detection of a search space associated with at least one of a last search space or a largest index if the determined number of the blind decodes is greater than the second PDCCH blind detection limit.

Aspect 13 is the apparatus of any of aspects 8-12, wherein to perform the blind detection on each PDCCH received in the set of consecutive slots, the at least one processor is further configured to: determine that a number of CCEs within the set of consecutive slots is greater than the second PDCCH blind detection limit; and drop the blind detection of PDCCH candidates with an AL greater than an AL threshold based on a search space associated with at least one of a lowest priority or a largest index.

Aspect 14 is the apparatus of any of aspects 8-13, wherein to perform the blind detection on each PDCCH received in the set of consecutive slots, the at least one processor is further configured to: drop the blind detection of at least one of search spaces or PDCCH candidates based on the first PDCCH blind detection limit before dropping the at least one of the search spaces or the PDCCH candidates based on the second PDCCH blind detection limit.

Aspect 15 is an apparatus for wireless communication, the apparatus being a UE, comprising: means for receiving PDCCH in a set of consecutive slots, the set of consecutive slots comprising at least two slots; and means for performing blind detection on each PDCCH received in the set of consecutive slots based on a first PDCCH blind detection limit and a second PDCCH blind detection limit, the first PDCCH blind detection limit being a single-slot limit, the second PDCCH blind detection limit being a multi-slot limit.

Aspect 16 is the apparatus of aspect 15, wherein the second PDCCH blind detection limit is based on a subcarrier spacing of the received PDCCH.

Aspect 17 is the apparatus of any of aspects 15-16, wherein the set of consecutive slots comprises n slots, where $n \geq 2$, and $D_2 < D_1 * n$, where $D_1$ is the first PDCCH blind detection limit and $D_2$ is the second PDCCH blind detection limit.

Aspect 18 is the apparatus of any of aspects 15-17, wherein the first PDCCH blind detection limit and the second PDCCH blind detection limit is each associated with at least one of a limit on a number of blind decodes, or a limit on a number of CCE subject to the blind detection.

Aspect 19 is the apparatus of any of aspects 15-18, wherein the means for performing the blind detection on each PDCCH received in the set of consecutive slots is configured to: determine that a number of blind decodes within the set of consecutive slots will be greater than the second PDCCH blind detection limit; and drop the blind detection of a search space associated with at least one of a last search space or a largest index if the determined number of the blind decodes is greater than the second PDCCH blind detection limit.

Aspect 20 is the apparatus of any of aspects 15-19, wherein the means for performing the blind detection on each PDCCH received in the set of consecutive slots is configured to: determine that a number of CCEs within the set of consecutive slots is greater than the second PDCCH blind detection limit; and drop the blind detection of PDCCH candidates with an AL greater than an AL threshold based on a search space associated with at least one of a lowest priority or a largest index.

Aspect 21 is the apparatus of any of aspects 15-20, wherein the means for performing the blind detection on each PDCCH received in the set of consecutive slots is configured to: drop the blind detection of at least one of search spaces or PDCCH candidates based on the first PDCCH blind detection limit before dropping the at least one of the search spaces or the PDCCH candidates based on the second PDCCH blind detection limit.

Aspect 22 is a computer-readable medium storing computer executable code, the code when executed by a processor of a UE cause the processor to: receive PDCCH in a set of consecutive slots, the set of consecutive slots comprising at least two slots; and perform blind detection on each PDCCH received in the set of consecutive slots based on a first PDCCH blind detection limit and a second PDCCH blind detection limit, the first PDCCH blind detection limit being a single-slot limit, the second PDCCH blind detection limit being a multi-slot limit.

Aspect 23 is the computer-readable medium of aspect 22, wherein the second PDCCH blind detection limit is based on a subcarrier spacing of the received PDCCH.

Aspect 24 is the computer-readable medium of any of aspects 22-23, wherein the set of consecutive slots comprises n slots, where $n \geq 2$, and $D_2 < D_1 * n$, where $D_1$ is the first PDCCH blind detection limit and $D_2$ is the second PDCCH blind detection limit.

Aspect 25 is the computer-readable medium of any of aspects 22-24, wherein the first PDCCH blind detection limit and the second PDCCH blind detection limit is each associated with at least one of a limit on a number of blind decodes, or a limit on a number of CCE subject to the blind detection.

Aspect 26 is the computer-readable medium of any of aspects 22-25, wherein to perform the blind detection on each PDCCH received in the set of consecutive slots, the code when executed by the processor of the UE further causes the processor to: determine that a number of blind decodes within the set of consecutive slots will be greater than the second PDCCH blind detection limit; and drop the blind detection of a search space associated with at least one of a last search space or a largest index if the determined number of the blind decodes is greater than the second PDCCH blind detection limit.

Aspect 27 is the computer-readable medium of any of aspects 22-26, wherein to perform the blind detection on each PDCCH received in the set of consecutive slots, the code when executed by the processor of the UE further causes the processor to: determine that a number of CCEs within the set of consecutive slots is greater than the second PDCCH blind detection limit; and drop the blind detection of PDCCH candidates with an AL greater than an AL threshold based on a search space associated with at least one of a lowest priority or a largest index.

Aspect 28 is the computer-readable medium of any of aspects 22-27, wherein to perform the blind detection on each PDCCH received in the set of consecutive slots, the code when executed by the processor of the UE further causes the processor to: drop the blind detection of at least one of search spaces or PDCCH candidates based on the first PDCCH blind detection limit before dropping the at least one of the search spaces or the PDCCH candidates based on the second PDCCH blind detection limit.

What is claimed is:

1. A method of wireless communication of a user equipment (UE), comprising:
   receiving physical downlink control channel (PDCCH) in a set of consecutive slots, the set of consecutive slots comprising at least two slots; and
   performing blind detection on each PDCCH received in the set of consecutive slots based on a first PDCCH blind detection limit and a second PDCCH blind detection limit, the first PDCCH blind detection limit being a single-slot limit, the second PDCCH blind detection limit being a multi-slot limit, the first PDCCH blind detection limit and the second PDCCH blind detection limit being each associated with at least one of a limit on a number of blind decodes, or a limit on a number of control channel elements (CCE) subject to the blind detection,
   wherein the set of consecutive slots comprises n slots, where $n \geq 2$, and $D_2 < D_1 * n$, where $D_1$ is the first PDCCH blind detection limit and $D_2$ is the second PDCCH blind detection limit.

2. The method of claim 1, wherein the second PDCCH blind detection limit is based on a subcarrier spacing of the received PDCCH.

3. The method of claim 1, wherein the performing the blind detection on each PDCCH received in the set of consecutive slots comprises:

determining that a number of blind decodes within the set of consecutive slots will be greater than the second PDCCH blind detection limit; and
dropping the blind detection of a search space associated with at least one of a last search space or a largest index if the determined number of the blind decodes is greater than the second PDCCH blind detection limit.

4. The method of claim 1, wherein the performing the blind detection on each PDCCH received in the set of consecutive slots comprises:
determining that a number of control channel elements (CCEs) within the set of consecutive slots is greater than the second PDCCH blind detection limit; and
dropping the blind detection of PDCCH candidates with an aggregation level (AL) greater than an AL threshold based on a search space associated with at least one of a lowest priority or a largest index.

5. The method of claim 1, wherein the performing the blind detection on each PDCCH received in the set of consecutive slots comprises:
dropping the blind detection of at least one of search spaces or PDCCH candidates based on the first PDCCH blind detection limit before dropping the at least one of the search spaces or the PDCCH candidates based on the second PDCCH blind detection limit.

6. An apparatus for wireless communication, the apparatus being a user equipment (UE), comprising:
a memory; and
at least one processor coupled to the memory and configured to:
receive physical downlink control channel (PDCCH) in a set of consecutive slots, the set of consecutive slots comprising at least two slots; and
perform blind detection on each PDCCH received in the set of consecutive slots based on a first PDCCH blind detection limit and a second PDCCH blind detection limit, the first PDCCH blind detection limit being a single-slot limit, the second PDCCH blind detection limit being a multi-slot limit, the first PDCCH blind detection limit and the second PDCCH blind detection limit being each associated with at least one of a limit on a number of blind decodes, or a limit on a number of control channel elements (CCE) subject to the blind detection, wherein the set of consecutive slots comprises n slots, where n≥2, and $D_2 < D_1 * n$, where $D_1$ is the first PDCCH blind detection limit and $D_2$ is the second PDCCH blind detection limit.

7. The apparatus of claim 6, wherein the second PDCCH blind detection limit is based on a subcarrier spacing of the received PDCCH.

8. The apparatus of claim 6, wherein to perform the blind detection on each PDCCH received in the set of consecutive slots, the at least one processor is further configured to:
determine that a number of blind decodes within the set of consecutive slots will be greater than the second PDCCH blind detection limit; and
drop the blind detection of a search space associated with at least one of a last search space or a largest index if the determined number of the blind decodes is greater than the second PDCCH blind detection limit.

9. The apparatus of claim 6, wherein to perform the blind detection on each PDCCH received in the set of consecutive slots, the at least one processor is further configured to:
determine that a number of control channel elements (CCEs) within the set of consecutive slots is greater than the second PDCCH blind detection limit; and
drop the blind detection of PDCCH candidates with an aggregation level (AL) greater than an AL threshold based on a search space associated with at least one of a lowest priority or a largest index.

10. The apparatus of claim 6, wherein to perform the blind detection on each PDCCH received in the set of consecutive slots, the at least one processor is further configured to:
drop the blind detection of at least one of search spaces or PDCCH candidates based on the first PDCCH blind detection limit before dropping the at least one of the search spaces or the PDCCH candidates based on the second PDCCH blind detection limit.

11. An apparatus for wireless communication, the apparatus being a user equipment (UE), comprising:
means for receiving physical downlink control channel (PDCCH) in a set of consecutive slots, the set of consecutive slots comprising at least two slots; and
means for performing blind detection on each PDCCH received in the set of consecutive slots based on a first PDCCH blind detection limit and a second PDCCH blind detection limit, the first PDCCH blind detection limit being a single-slot limit, the second PDCCH blind detection limit being a multi-slot limit, the first PDCCH blind detection limit and the second PDCCH blind detection limit being each associated with at least one of a limit on a number of blind decodes, or a limit on a number of control channel elements (CCE) subject to the blind detection wherein the set of consecutive slots comprises n slots, where n≥2, and $D_2 < D_1 * n$, where $D_1$ is the first PDCCH blind detection limit and $D_2$ is the second PDCCH blind detection limit.

12. The apparatus of claim 11, wherein the second PDCCH blind detection limit is based on a subcarrier spacing of the received PDCCH.

13. The apparatus of claim 11, wherein the means for performing the blind detection on each PDCCH received in the set of consecutive slots is configured to:
determine that a number of blind decodes within the set of consecutive slots will be greater than the second PDCCH blind detection limit; and
drop the blind detection of a search space associated with at least one of a last search space or a largest index if the determined number of the blind decodes is greater than the second PDCCH blind detection limit.

14. The apparatus of claim 11, wherein the means for performing the blind detection on each PDCCH received in the set of consecutive slots is configured to:
determine that a number of control channel elements (CCEs) within the set of consecutive slots is greater than the second PDCCH blind detection limit; and
drop the blind detection of PDCCH candidates with an aggregation level (AL) greater than an AL threshold based on a search space associated with at least one of a lowest priority or a largest index.

15. The apparatus of claim 11, wherein the means for performing the blind detection on each PDCCH received in the set of consecutive slots is configured to:
drop the blind detection of at least one of search spaces or PDCCH candidates based on the first PDCCH blind detection limit before dropping the at least one of the search spaces or the PDCCH candidates based on the second PDCCH blind detection limit.

16. A computer-readable medium storing computer executable code, the code when executed by a processor of a user equipment (UE) cause the processor to:

receive physical downlink control channel (PDCCH) in a set of consecutive slots, the set of consecutive slots comprising at least two slots; and perform blind detection on each PDCCH received in the set of consecutive slots based on a first PDCCH blind detection limit and a second PDCCH blind detection limit, the first PDCCH blind detection limit being a single-slot limit, the second PDCCH blind detection limit being a multi-slot limit, the first PDCCH blind detection limit and the second PDCCH blind detection limit being each associated with at least one of a limit on a number of blind decodes, or a limit on a number of control channel elements (CCE) subject to the blind detection, wherein the set of consecutive slots comprises n slots, where n≥2, and $D_2 < D_1 * n$, where $D_1$ is the first PDCCH blind detection limit and $D_2$ is the second PDCCH blind detection limit.

17. The computer-readable medium of claim 16, wherein the second PDCCH blind detection limit is based on a subcarrier spacing of the received PDCCH.

18. The computer-readable medium of claim 16, wherein to perform the blind detection on each PDCCH received in the set of consecutive slots, the code when executed by the processor of the UE further causes the processor to:

determine that a number of blind decodes within the set of consecutive slots will be greater than the second PDCCH blind detection limit; and drop the blind detection of a search space associated with at least one of a last search space or a largest index if the determined number of the blind decodes is greater than the second PDCCH blind detection limit.

19. The computer-readable medium of claim 16, wherein to perform the blind detection on each PDCCH received in the set of consecutive slots, the code when executed by the processor of the UE further causes the processor to:

determine that a number of control channel elements (CCEs) within the set of consecutive slots is greater than the second PDCCH blind detection limit; and drop the blind detection of PDCCH candidates with an aggregation level (AL) greater than an AL threshold based on a search space associated with at least one of a lowest priority or a largest index.

20. The computer-readable medium of claim 16, wherein to perform the blind detection on each PDCCH received in the set of consecutive slots, the code when executed by the processor of the UE further causes the processor to:

drop the blind detection of at least one of search spaces or PDCCH candidates based on the first PDCCH blind detection limit before dropping the at least one of the search spaces or the PDCCH candidates based on the second PDCCH blind detection limit.

* * * * *